(12) United States Patent
Farley et al.

(10) Patent No.: US 9,699,736 B2
(45) Date of Patent: *Jul. 4, 2017

(54) REDUCING A NUMBER OF WAKE-UP FRAMES IN A SEQUENCE OF WAKE-UP FRAMES

(71) Applicant: Google Inc., Mountain View, CA (US)

(72) Inventors: Matthew J. Farley, Los Angeles, CA (US); LaMonte Peter Koop, Alpharetta, GA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/248,576

(22) Filed: Aug. 26, 2016

(65) Prior Publication Data

US 2017/0041876 A1 Feb. 9, 2017

Related U.S. Application Data

(63) Continuation of application No. 14/754,115, filed on Jun. 29, 2015, now Pat. No. 9,532,310, which is a
(Continued)

(51) Int. Cl.
*G08C 17/00* (2006.01)
*H04W 52/02* (2009.01)
*H04W 28/02* (2009.01)

(52) U.S. Cl.
CPC ... *H04W 52/0235* (2013.01); *H04W 28/0247* (2013.01); *Y02B 60/50* (2013.01)

(58) Field of Classification Search
None
See application file for complete search history.

(56) References Cited

U.S. PATENT DOCUMENTS 3,805,265 A  4/1974 Lester
4,165,024 A  8/1979 Oswalt et al.
(Continued)

FOREIGN PATENT DOCUMENTS

EP  0467036  1/1992
EP  0601820  6/1994
(Continued)

OTHER PUBLICATIONS

US 9,445,367, 09/2016, Farley et al. (withdrawn)
(Continued)

*Primary Examiner* — Otis L Thompson, Jr.
(74) *Attorney, Agent, or Firm* — Wolfe-SBMC (57) ABSTRACT

A method for receiver state estimation includes communicating, from a first communications device to a second communications device, a first plurality of wake-up frames; receiving, at the first communications device from the second communications device, an indication of a received wake-up frame of the communicated first plurality of wake-up frames; determining, by the first communications device, a time at which the second communications device is in a ready state based on the received indication; subsequently communicating, from the first communications device to the second communications device, a second plurality of wake-up frames. The first plurality is greater than the second plurality, the reduction in number from the first plurality to the second plurality being based on the determined time at which the second communications device is in a ready state.

33 Claims, 3 Drawing Sheets

Related U.S. Application Data continuation of application No. 13/620,171, filed on Sep. 14, 2012, now Pat. No. 9,072,049, which is a continuation of application No. 12/647,672, filed on Dec. 28, 2009, now Pat. No. 8,391,435.

(60) Provisional application No. 61/140,884, filed on Dec. 25, 2008.

(56) References Cited

U.S. PATENT DOCUMENTS

| | | |
|---|---|---|
| 4,613,990 A | 9/1986 | Halpern |
| 4,680,583 A | 7/1987 | Grover |
| 4,688,244 A | 8/1987 | Hannon et al. |
| 4,750,197 A | 6/1988 | Denekamp et al. |
| 4,802,240 A | 1/1989 | Yamaguchi et al. |
| 4,817,537 A | 4/1989 | Cripe et al. |
| 4,964,121 A | 10/1990 | Moore |
| 5,040,238 A | 8/1991 | Comroe et al. |
| 5,054,052 A | 10/1991 | Nonami |
| 5,117,501 A | 5/1992 | Childress et al. |
| 5,129,096 A | 7/1992 | Burns |
| 5,210,540 A | 5/1993 | Masumoto |
| 5,265,025 A | 11/1993 | Hirata |
| 5,295,154 A | 3/1994 | Meier et al. |
| 5,331,637 A | 7/1994 | Francis et al. |
| 5,355,518 A | 10/1994 | Kindinger et al. |
| 5,369,784 A | 11/1994 | Nelson |
| 5,400,254 A | 3/1995 | Fujita |
| 5,424,720 A | 6/1995 | Kirkpatrick |
| 5,425,051 A | 6/1995 | Mahany |
| 5,442,758 A | 8/1995 | Slingwine et al. |
| 5,511,232 A | 4/1996 | O'Dea et al. |
| 5,540,092 A | 7/1996 | Handfield et al. |
| 5,565,858 A | 10/1996 | Guthrie |
| 5,579,306 A | 11/1996 | Dent |
| 5,590,409 A | 12/1996 | Sawahashi et al. |
| 5,596,652 A | 1/1997 | Piatek et al. |
| 5,604,892 A | 2/1997 | Nuttall et al. |
| 5,606,313 A | 2/1997 | Allen et al. |
| 5,640,151 A | 6/1997 | Reis et al. |
| 5,652,751 A | 7/1997 | Sharony |
| 5,682,379 A | 10/1997 | Mahany et al. |
| 5,686,902 A | 11/1997 | Reis et al. |
| 5,732,007 A | 3/1998 | Grushin et al. |
| 5,732,077 A | 3/1998 | Whitehead |
| 5,761,195 A | 6/1998 | Lu et al. |
| 5,790,946 A | 8/1998 | Rotzoll |
| 5,793,882 A | 8/1998 | Piatek et al. |
| 5,802,274 A | 9/1998 | Dorak et al. |
| 5,833,910 A | 11/1998 | Teixido |
| 5,862,803 A | 1/1999 | Besson et al. |
| 5,890,054 A | 3/1999 | Logsdon et al. |
| 5,892,441 A | 4/1999 | Woolley et al. |
| 5,907,491 A | 5/1999 | Canada et al. |
| 5,913,180 A | 6/1999 | Ryan |
| 5,917,423 A | 6/1999 | Duvall |
| 5,917,433 A | 6/1999 | Keillor et al. |
| 5,939,982 A | 8/1999 | Gagnon et al. |
| 5,943,610 A | 8/1999 | Endo |
| 5,950,124 A | 9/1999 | Trompower et al. |
| 5,959,568 A | 9/1999 | Woolley |
| 5,974,236 A | 10/1999 | Sherman |
| 5,977,913 A | 11/1999 | Christ |
| 6,005,884 A | 12/1999 | Cook et al. |
| 6,006,100 A | 12/1999 | Koenck et al. |
| 6,046,675 A | 4/2000 | Hanna |
| 6,072,784 A | 6/2000 | Agrawal et al. |
| 6,078,785 A | 6/2000 | Bush |
| 6,078,789 A | 6/2000 | Bodenmann et al. |
| 6,091,724 A | 7/2000 | Chandra et al. |
| 6,097,707 A | 8/2000 | Hodzic et al. |
| 6,104,512 A | 8/2000 | Batey et al. |
| 6,108,544 A | 8/2000 | Dorenbosch et al. |
| 6,118,988 A | 9/2000 | Choi |
| 6,125,306 A | 9/2000 | Shimada et al. |
| 6,127,928 A | 10/2000 | Issacman |
| 6,127,976 A | 10/2000 | Boyd et al. |
| 6,134,587 A | 10/2000 | Okanoue |
| 6,134,589 A | 10/2000 | Hultgren |
| 6,154,658 A | 11/2000 | Caci |
| 6,192,400 B1 | 2/2001 | Hanson et al. |
| 6,198,913 B1 | 3/2001 | Sung et al. |
| 6,201,974 B1 | 3/2001 | Lietsalmi et al. |
| 6,225,894 B1 | 5/2001 | Kyrtsos |
| 6,239,690 B1 | 5/2001 | Burbidge et al. |
| 6,246,882 B1 | 6/2001 | Lachance |
| 6,256,303 B1 | 7/2001 | Drakoulis et al. |
| 6,313,745 B1 | 11/2001 | Suzuki |
| 6,354,493 B1 | 3/2002 | Mon |
| 6,360,169 B1 | 3/2002 | Dudaney |
| 6,381,467 B1 | 4/2002 | Hill et al. |
| 6,404,082 B1 | 6/2002 | Rasinski et al. |
| 6,405,102 B1 | 6/2002 | Swartz et al. |
| 6,409,082 B1 | 6/2002 | Davis et al. |
| 6,418,299 B1 | 7/2002 | Ramanathan |
| 6,424,260 B2 | 7/2002 | Maloney |
| 6,424,264 B1 | 7/2002 | Giraldin et al. |
| 6,427,913 B1 | 8/2002 | Maloney |
| 6,437,692 B1 | 8/2002 | Petite et al. |
| 6,473,607 B1 | 10/2002 | Shohara et al. |
| 6,476,708 B1 | 11/2002 | Johnson |
| 6,480,149 B1 | 11/2002 | Twitchell |
| 6,481,222 B1 | 11/2002 | Denniston |
| 6,512,478 B1 | 1/2003 | Chien |
| 6,529,142 B2 | 3/2003 | Yeh et al. |
| 6,542,114 B1 | 4/2003 | Eagleson et al. |
| 6,547,137 B1 | 4/2003 | Begelfer et al. |
| 6,559,620 B2 | 5/2003 | Zhou et al. |
| 6,587,755 B1 | 7/2003 | Smith et al. |
| 6,600,418 B2 | 7/2003 | Francis et al. |
| 6,611,556 B1 | 8/2003 | Koerner et al. |
| 6,614,349 B1 | 9/2003 | Proctor et al. |
| 6,617,962 B1 | 9/2003 | Horwitz et al. |
| 6,628,835 B1 | 9/2003 | Brill et al. |
| 6,665,585 B2 | 12/2003 | Kawase |
| 6,693,907 B1 | 2/2004 | Wesley et al. |
| 6,700,533 B1 | 3/2004 | Werb et al. |
| 6,717,507 B1 | 4/2004 | Bayley et al. |
| 6,720,888 B2 | 4/2004 | Eagleson et al. |
| 6,737,974 B2 | 5/2004 | Dickinson |
| 6,744,740 B2 | 6/2004 | Chen |
| 6,745,027 B2 | 6/2004 | Twitchell et al. |
| 6,747,558 B1 | 6/2004 | Thorne et al. |
| 6,747,562 B2 | 6/2004 | Giraldin et al. |
| 6,753,775 B2 | 6/2004 | Auerbach et al. |
| 6,760,578 B2 | 7/2004 | Rotzoll |
| 6,761,312 B2 | 7/2004 | Piatek et al. |
| 6,765,484 B2 | 7/2004 | Eagleson et al. |
| 6,799,210 B1 | 9/2004 | Gentry et al. |
| 6,816,063 B2 | 11/2004 | Kubler et al. |
| 6,847,892 B2 | 1/2005 | Zhou et al. |
| 6,870,476 B2 | 3/2005 | Cockburn et al. |
| 6,874,037 B1 | 3/2005 | Abram et al. |
| 6,882,274 B2 | 4/2005 | Richardson et al. |
| 6,900,731 B2 | 5/2005 | Kreiner |
| 6,919,803 B2 | 7/2005 | Breed |
| 6,927,688 B2 | 8/2005 | Tice |
| 6,934,540 B2 | 8/2005 | Twitchell et al. |
| 6,940,392 B2 | 9/2005 | Chan et al. |
| 6,972,682 B2 | 12/2005 | Lareau et al. |
| 6,975,614 B2 | 12/2005 | Kennedy |
| 6,988,079 B1 | 1/2006 | Or-Bach et al. |
| 7,012,529 B2 | 3/2006 | Sajkowsky |
| 7,022,773 B2 | 4/2006 | Albano et al. |
| 7,027,773 B1 | 4/2006 | McMillin |
| 7,034,683 B2 | 4/2006 | Ghazarian |
| 7,038,585 B2 | 5/2006 | Hall |
| 7,072,668 B2 | 7/2006 | Chou |
| 7,088,229 B2 | 8/2006 | Johnson |
| 7,098,784 B2 | 8/2006 | Easley et al. |
| 7,103,344 B2 | 9/2006 | Menard |
| 7,126,470 B2 | 10/2006 | Clift et al. |
| 7,133,704 B2 | 11/2006 | Twitchell |

(56) References Cited

U.S. PATENT DOCUMENTS

| | | |
|---|---|---|
| 7,142,121 B2 | 11/2006 | Chan et al. |
| 7,148,800 B2 | 12/2006 | Cunningham |
| 7,148,803 B2 | 12/2006 | Bandy |
| 7,155,238 B2 | 12/2006 | Katz |
| 7,155,264 B2 | 12/2006 | Twitchell et al. |
| 7,191,934 B2 | 3/2007 | Miller et al. |
| 7,196,622 B2 | 3/2007 | Lambright |
| 7,200,132 B2 | 4/2007 | Twitchell et al. |
| 7,209,037 B2 | 4/2007 | Webb |
| 7,209,468 B2 | 4/2007 | Twitchell et al. |
| 7,209,771 B2 | 4/2007 | Twitchell et al. |
| 7,212,122 B2 | 5/2007 | Gloekler |
| 7,221,668 B2 | 5/2007 | Twitchell et al. |
| 7,230,933 B2 | 6/2007 | Bahl et al. |
| 7,233,958 B2 | 6/2007 | Weng |
| 7,239,238 B2 | 7/2007 | Tester et al. |
| 7,248,160 B2 | 7/2007 | Mangan et al. |
| 7,253,731 B2 | 8/2007 | Joao |
| 7,270,353 B2 | 9/2007 | Sironi et al. |
| 7,273,172 B2 | 9/2007 | Olsen |
| 7,274,295 B2 | 9/2007 | Koch |
| 7,277,009 B2 | 10/2007 | Hall |
| 7,282,944 B2 | 10/2007 | Gunn et al. |
| 7,283,052 B2 | 10/2007 | Bohman |
| 7,299,068 B1 | 11/2007 | Halla |
| 7,313,421 B2 | 12/2007 | Dejanovic |
| 7,315,281 B2 | 1/2008 | Dejanovic |
| 7,317,382 B2 | 1/2008 | Pratt |
| 7,319,397 B2 | 1/2008 | Chung |
| 7,323,981 B2 | 1/2008 | Peel |
| 7,333,015 B2 | 2/2008 | Ekstrom |
| 7,339,469 B2 | 3/2008 | Braun |
| 7,340,260 B2 | 3/2008 | McAlexander |
| 7,342,496 B2 | 3/2008 | Muirhead |
| 7,342,497 B2 | 3/2008 | Chung |
| 7,348,875 B2 | 3/2008 | Hughes et al. |
| 7,349,803 B2 | 3/2008 | Belenkii et al. |
| 7,349,804 B2 | 3/2008 | Belenkii |
| 7,376,507 B1 | 5/2008 | Daily et al. |
| 7,378,957 B2 | 5/2008 | Twitchell et al. |
| 7,378,958 B2 | 5/2008 | Twitchell et al. |
| 7,378,959 B2 | 5/2008 | Twitchell et al. |
| 7,378,960 B1 | 5/2008 | Binding |
| 7,382,251 B2 | 6/2008 | Bohman |
| 7,391,321 B2 | 6/2008 | Twitchell et al. |
| 7,394,358 B2 | 7/2008 | Cherry |
| 7,394,361 B1 | 7/2008 | Twitchell et al. |
| 7,394,372 B2 | 7/2008 | Gloekler |
| 7,397,363 B2 | 7/2008 | Joao |
| 7,417,543 B2 | 8/2008 | Bergman |
| 7,419,101 B2 | 9/2008 | Kawai |
| 7,423,534 B2 | 9/2008 | Dhanjal |
| 7,423,535 B2 | 9/2008 | Chung |
| 7,430,437 B2 | 9/2008 | Twitchell et al. |
| 7,438,334 B2 | 10/2008 | Terry et al. |
| 7,440,781 B2 | 10/2008 | Beach et al. |
| 7,482,920 B2 | 1/2009 | Joao |
| 7,489,244 B2 | 2/2009 | August et al. |
| 7,522,568 B2 | 4/2009 | Twitchell et al. |
| 7,526,381 B2 | 4/2009 | Twitchell |
| 7,528,719 B2 | 5/2009 | Hopman et al. |
| 7,529,547 B2 | 5/2009 | Twitchell |
| 7,538,656 B2 | 5/2009 | Twitchell et al. |
| 7,538,657 B2 | 5/2009 | Twitchell et al. |
| 7,538,658 B2 | 5/2009 | Twitchell et al. |
| 7,538,672 B2 | 5/2009 | Lockyer et al. |
| 7,539,520 B2 | 5/2009 | Twitchell et al. |
| 7,542,849 B2 | 6/2009 | Twitchell et al. |
| 7,563,991 B2 | 7/2009 | Clark et al. |
| 7,574,168 B2 | 8/2009 | Twitchell et al. |
| 7,574,300 B2 | 8/2009 | Twitchell et al. |
| 7,583,769 B2 | 9/2009 | Smith et al. |
| 7,595,727 B2 | 9/2009 | Grijalva et al. |
| 7,600,137 B2 | 10/2009 | Trappeniers et al. |
| 7,782,200 B1 | 8/2010 | Fleischmann |
| 7,907,941 B2 | 3/2011 | Twitchell |
| 7,924,735 B2 | 4/2011 | Sun et al. |
| 7,940,716 B2 | 5/2011 | Twitchell |
| 7,986,238 B2 | 7/2011 | Cho |
| 8,000,315 B2 | 8/2011 | Doi et al. |
| 8,111,651 B2 | 2/2012 | Twitchell |
| 8,125,978 B2 | 2/2012 | Lim et al. |
| 8,165,072 B2 | 4/2012 | Mooney et al. |
| 8,175,109 B2 | 5/2012 | Nogueira-Nine et al. |
| 8,188,764 B2 | 5/2012 | Weiss et al. |
| 8,275,404 B2 | 9/2012 | Berger et al. |
| 8,391,435 B2 | 3/2013 | Farley et al. |
| 8,462,662 B2 | 6/2013 | Robins et al. |
| 8,514,758 B2 | 8/2013 | De Kimpe et al. |
| 8,531,268 B2 | 9/2013 | Ghabra et al. |
| 8,605,660 B2 | 12/2013 | Twitchell |
| 8,619,652 B2 | 12/2013 | Singh et al. |
| 8,954,082 B2 | 2/2015 | Twitchell |
| 9,072,049 B2 | 6/2015 | Farley et al. |
| 9,295,099 B2 | 3/2016 | Twitchell et al. |
| 9,386,553 B2 | 7/2016 | Berger et al. |
| 9,532,310 B2 | 12/2016 | Farley et al. |
| 2001/0000019 A1 | 3/2001 | Bowers et al. |
| 2001/0050550 A1 | 12/2001 | Yoshida et al. |
| 2002/0030596 A1 | 3/2002 | Finn et al. |
| 2002/0039896 A1 | 4/2002 | Brown |
| 2002/0050632 A1 | 5/2002 | Tuttle |
| 2002/0050932 A1 | 5/2002 | Rhoades et al. |
| 2002/0073646 A1 | 6/2002 | Von Gutfeld et al. |
| 2002/0089434 A1 | 7/2002 | Ghazarian |
| 2002/0098861 A1 | 7/2002 | Doney et al. |
| 2002/0099567 A1 | 7/2002 | Joao |
| 2002/0119770 A1 | 8/2002 | Twitchell |
| 2002/0130778 A1 | 9/2002 | Nicholson |
| 2002/0146985 A1 | 10/2002 | Naden |
| 2003/0008692 A1 | 1/2003 | Phelan |
| 2003/0011474 A1 | 1/2003 | Ng |
| 2003/0083064 A1 | 5/2003 | Cooper |
| 2003/0117966 A1 | 6/2003 | Chen |
| 2003/0140135 A1 | 7/2003 | Okuyama et al. |
| 2003/0141973 A1 | 7/2003 | Yeh et al. |
| 2003/0144020 A1 | 7/2003 | Challa et al. |
| 2003/0179073 A1 | 9/2003 | Ghazarian |
| 2003/0182077 A1 | 9/2003 | Emord |
| 2003/0189491 A1 | 10/2003 | Ng |
| 2003/0202477 A1 | 10/2003 | Zhen et al. |
| 2003/0209601 A1 | 11/2003 | Chung |
| 2003/0236077 A1 | 12/2003 | Sivard |
| 2004/0021572 A1 | 2/2004 | Schoen et al. |
| 2004/0025018 A1 | 2/2004 | Haas et al. |
| 2004/0041706 A1 | 3/2004 | Stratmoen et al. |
| 2004/0041731 A1 | 3/2004 | Hisano |
| 2004/0082296 A1 | 4/2004 | Twitchell |
| 2004/0100379 A1 | 5/2004 | Boman et al. |
| 2004/0100394 A1 | 5/2004 | Hitt |
| 2004/0100415 A1 | 5/2004 | Veitch et al. |
| 2004/0113772 A1 | 6/2004 | Chou |
| 2004/0119588 A1 | 6/2004 | Marks |
| 2004/0121793 A1 | 6/2004 | Weigele et al. |
| 2004/0135691 A1 | 7/2004 | Duron et al. |
| 2004/0142716 A1 | 7/2004 | Orlik et al. |
| 2004/0143750 A1 | 7/2004 | Kulack et al. |
| 2004/0147267 A1 | 7/2004 | Hill et al. |
| 2004/0174259 A1 | 9/2004 | Peel |
| 2004/0183673 A1 | 9/2004 | Nageli |
| 2004/0198467 A1 | 10/2004 | Orlik et al. |
| 2004/0215532 A1 | 10/2004 | Boman et al. |
| 2004/0232924 A1 | 11/2004 | Hilleary et al. |
| 2004/0233041 A1 | 11/2004 | Bohman et al. |
| 2004/0233054 A1 | 11/2004 | Neff et al. |
| 2004/0246463 A1 | 12/2004 | Milinusic |
| 2004/0246903 A1 | 12/2004 | Huang et al. |
| 2005/0043068 A1 | 2/2005 | Shohara et al. |
| 2005/0071358 A1 | 3/2005 | Hind et al. |
| 2005/0073406 A1 | 4/2005 | Easley et al. |
| 2005/0078672 A1 | 4/2005 | Caliskan et al. |
| 2005/0087235 A1 | 4/2005 | Skorpik |
| 2005/0088299 A1 | 4/2005 | Bandy |
| 2005/0090211 A1 | 4/2005 | Lilja et al. |

(56) References Cited

U.S. PATENT DOCUMENTS

| | | |
|---|---|---|
| 2005/0093702 A1 | 5/2005 | Twitchell |
| 2005/0093703 A1 | 5/2005 | Twitchell |
| 2005/0099292 A1 | 5/2005 | Sajkowsky |
| 2005/0111428 A1 | 5/2005 | Orlik et al. |
| 2005/0128080 A1 | 6/2005 | Hall et al. |
| 2005/0129034 A1 | 6/2005 | Takeyoshi et al. |
| 2005/0145018 A1 | 7/2005 | Sabata et al. |
| 2005/0146445 A1 | 7/2005 | Sieboda et al. |
| 2005/0152318 A1 | 7/2005 | Elbatt et al. |
| 2005/0154527 A1 | 7/2005 | Ulrich |
| 2005/0157659 A1 | 7/2005 | Huitema |
| 2005/0190759 A1 | 9/2005 | Lee et al. |
| 2005/0199716 A1 | 9/2005 | Shafer et al. |
| 2005/0215280 A1 | 9/2005 | Twitchell |
| 2005/0226201 A1 | 10/2005 | McMillin |
| 2005/0261037 A1 | 11/2005 | Raghunath et al. |
| 2005/0270160 A1 | 12/2005 | Chan et al. |
| 2006/0007863 A1 | 1/2006 | Naghian |
| 2006/0109106 A1 | 5/2006 | Braun |
| 2006/0114102 A1 | 6/2006 | Chang et al. |
| 2006/0132485 A1 | 6/2006 | Milinusic |
| 2006/0135145 A1 | 6/2006 | Redi |
| 2006/0146717 A1 | 7/2006 | Conner et al. |
| 2006/0158326 A1 | 7/2006 | Easley |
| 2006/0163422 A1 | 7/2006 | Krikorian et al. |
| 2006/0164232 A1 | 7/2006 | Waterhouse et al. |
| 2006/0164239 A1 | 7/2006 | Loda |
| 2006/0187026 A1 | 8/2006 | Kochis |
| 2006/0202817 A1 | 9/2006 | Mackenzie et al. |
| 2006/0239197 A1 | 10/2006 | Lieuallen et al. |
| 2006/0255934 A1 | 11/2006 | Easley et al. |
| 2006/0268727 A1 | 11/2006 | Rangarajan et al. |
| 2006/0270382 A1 | 11/2006 | Lappetelainen et al. |
| 2006/0276161 A1 | 12/2006 | Twitchell et al. |
| 2006/0282546 A1 | 12/2006 | Reynolds et al. |
| 2006/0286988 A1 | 12/2006 | Blume et al. |
| 2006/0287008 A1 | 12/2006 | Twitchell et al. |
| 2007/0002792 A1 | 1/2007 | Twitchell et al. |
| 2007/0002793 A1 | 1/2007 | Twitchell et al. |
| 2007/0004331 A1 | 1/2007 | Twitchell et al. |
| 2007/0008408 A1 | 1/2007 | Zehavi |
| 2007/0032951 A1 | 2/2007 | Tanenhaus et al. |
| 2007/0041333 A1 | 2/2007 | Twitchell et al. |
| 2007/0041345 A1 | 2/2007 | Yarvis et al. |
| 2007/0043807 A1 | 2/2007 | Twitchell et al. |
| 2007/0044524 A1 | 3/2007 | Coutermarsh et al. |
| 2007/0069885 A1 | 3/2007 | Twitchell et al. |
| 2007/0099628 A1 | 5/2007 | Twitchell et al. |
| 2007/0099629 A1 | 5/2007 | Twitchell et al. |
| 2007/0113882 A1 | 5/2007 | Meyers |
| 2007/0115114 A1 | 5/2007 | Meyers |
| 2007/0115115 A1 | 5/2007 | Meyers |
| 2007/0115827 A1 | 5/2007 | Boehnke et al. |
| 2007/0115859 A1 | 5/2007 | Meyers |
| 2007/0118332 A1 | 5/2007 | Meyers |
| 2007/0121557 A1 | 5/2007 | Sylvain |
| 2007/0133980 A1 | 6/2007 | Meyers |
| 2007/0135179 A1 | 6/2007 | Hardman et al. |
| 2007/0139197 A1 | 6/2007 | Hopman |
| 2007/0147255 A1 | 6/2007 | Oyman |
| 2007/0152815 A1 | 7/2007 | Meyers |
| 2007/0155327 A1 | 7/2007 | Twitchell et al. |
| 2007/0159999 A1 | 7/2007 | Twitchell et al. |
| 2007/0195702 A1 | 8/2007 | Yuen et al. |
| 2007/0200765 A1 | 8/2007 | Meyers |
| 2007/0274232 A1 | 11/2007 | Axelsson et al. |
| 2007/0291690 A1 | 12/2007 | Twitchell et al. |
| 2007/0291724 A1 | 12/2007 | Twitchell et al. |
| 2008/0027586 A1 | 1/2008 | Hern et al. |
| 2008/0066658 A1 | 3/2008 | Muirhead |
| 2008/0094209 A1 | 4/2008 | Braun |
| 2008/0111692 A1 | 5/2008 | Twitchell et al. |
| 2008/0112377 A1 | 5/2008 | Twitchell et al. |
| 2008/0112378 A1 | 5/2008 | Twitchell et al. |
| 2008/0117040 A1 | 5/2008 | Peel |
| 2008/0129458 A1 | 6/2008 | Twitchell |
| 2008/0142592 A1 | 6/2008 | Twitchell et al. |
| 2008/0143484 A1 | 6/2008 | Twitchell et al. |
| 2008/0144554 A1 | 6/2008 | Twitchell et al. |
| 2008/0151850 A1 | 6/2008 | Twitchell et al. |
| 2008/0165749 A1 | 7/2008 | Twitchell et al. |
| 2008/0180252 A1 | 7/2008 | Vogt |
| 2008/0212544 A1 | 9/2008 | Twitchell et al. |
| 2008/0234878 A1 | 9/2008 | Joao |
| 2008/0264888 A1 | 10/2008 | Zakula et al. |
| 2008/0291844 A1 | 11/2008 | Krause |
| 2008/0303897 A1 | 12/2008 | Twitchell et al. |
| 2008/0304443 A1 | 12/2008 | Twitchell |
| 2008/0315596 A1 | 12/2008 | Terry et al. |
| 2009/0016308 A1 | 1/2009 | Twitchell |
| 2009/0092082 A1 | 4/2009 | Twitchelln et al. |
| 2009/0103462 A1 | 4/2009 | Twitchell et al. |
| 2009/0104902 A1 | 4/2009 | Twitchell et al. |
| 2009/0122737 A1 | 5/2009 | Twitchell et al. |
| 2009/0129306 A1 | 5/2009 | Twitchell et al. |
| 2009/0135000 A1 | 5/2009 | Twitchell et al. |
| 2009/0146805 A1 | 6/2009 | Joao |
| 2009/0161642 A1 | 6/2009 | Twitchell et al. |
| 2009/0181623 A1 | 7/2009 | Twitchell et al. |
| 2009/0290512 A1 | 11/2009 | Twitchell |
| 2009/0295564 A1 | 12/2009 | Twitchell |
| 2009/0322510 A1 | 12/2009 | Berger et al. |
| 2010/0013635 A1 | 1/2010 | Berger et al. |
| 2010/0067420 A1 | 3/2010 | Twitchell |
| 2010/0097969 A1 | 4/2010 | De Kimpe et al. |
| 2010/0141449 A1 | 6/2010 | Twitchell |
| 2010/0145865 A1 | 6/2010 | Berger et al. |
| 2010/0150122 A1 | 6/2010 | Berger et al. |
| 2010/0166113 A1 | 7/2010 | Farley et al. |
| 2010/0214060 A1 | 8/2010 | Twitchell |
| 2010/0214074 A1 | 8/2010 | Twitchell |
| 2010/0214969 A1 | 8/2010 | Lamm et al. |
| 2011/0138044 A1 | 6/2011 | Bailey et al. |
| 2011/0176465 A1 | 7/2011 | Panta et al. |
| 2011/0289320 A1 | 11/2011 | Twitchell et al. |
| 2012/0077434 A1 | 3/2012 | Royston et al. |
| 2012/0163422 A1 | 6/2012 | Lee et al. |
| 2012/0190390 A1 | 7/2012 | Reunamaki et al. |
| 2012/0250619 A1 | 10/2012 | Twitchell |
| 2013/0016636 A1 | 1/2013 | Berger et al. |
| 2013/0070657 A1 | 3/2013 | Farley et al. |
| 2013/0223420 A1 | 8/2013 | Twitchell et al. |
| 2014/0308963 A1 | 10/2014 | Twitchell et al. |
| 2015/0103747 A1 | 4/2015 | Twitchell |
| 2016/0044597 A1 | 2/2016 | Farley et al. |
| 2016/0219523 A1 | 7/2016 | Twitchell et al. |
| 2016/0300183 A1 | 10/2016 | Berger et al. |
| 2017/0048798 A9 | 2/2017 | Twitchell et al. |

FOREIGN PATENT DOCUMENTS

| | | |
|---|---|---|
| EP | 0748083 | 12/1996 |
| EP | 0748085 | 12/1996 |
| EP | 0829995 | 3/1998 |
| EP | 0944014 | 9/1999 |
| EP | 1692668 | 8/2006 |
| EP | 1317733 | 4/2010 |
| EP | 1692599 | 7/2013 |
| GB | 2308947 | 7/1997 |
| KR | 20040012311 | 2/2004 |
| KR | 100509070 | 8/2005 |
| KR | 20050102419 | 10/2005 |
| KR | 100587735 | 6/2006 |
| KR | 20070005515 | 1/2007 |
| KR | 20080001235 | 1/2008 |
| WO | WO-0068907 | 11/2000 |
| WO | WO-0069186 | 11/2000 |
| WO | WO-03098175 | 11/2003 |
| WO | WO-2006056174 | 6/2006 |

(56) References Cited

FOREIGN PATENT DOCUMENTS

| WO | WO-2009140669 | 11/2009 |
|---|---|---|
| WO | WO-2009151877 | 12/2009 |

OTHER PUBLICATIONS

"Final Office Action", U.S. Appl. No. 14/573,625, Dec. 14, 2016, 29 pages.
"Advisory Action", U.S. Appl. No. 12/353,197, Jul. 16, 2012, 5 pages.
"Advisory Action", U.S. Appl. No. 13/555,897, Nov. 6, 2014, 3 pages.
"Application Note Published by Texas Instruments for CC1100/CC2500 Products", Accessed on Dec. 19, 2008, 17 pages.
"Final Office Action", U.S. Appl. No. 12/353,197, Mar. 23, 2012, 15 pages.
"Final Office Action", U.S. Appl. No. 13/367,341, Feb. 26, 2013, 17 pages.
"Final Office Action", U.S. Appl. No. 13/555,897, Aug. 29, 2014, 14 pages.
"International Preliminary Report on Patentability", Application No. PCT/US2006/026158, Jan. 17, 2008, 9 pages.
"International Search Report and Written Opinion", Application No. PCT/US2009/044277, Jan. 27, 2010, 13 pages.
"International Search Report and Written Opinion", Application No. PCT/US2009/044276, Jan. 11, 2010, 7 pages.
"Non-Final Office Action", U.S. Appl. No. 11/428,536, Dec. 24, 2009, 10 pages.
"Non-Final Office Action", U.S. Appl. No. 12/271,850, May 11, 2011, 13 pages.
"Non-Final Office Action", U.S. Appl. No. 12/353,197, Oct. 6, 2011, 11 pages.
"Non-Final Office Action", U.S. Appl. No. 12/468,047, Dec. 13, 2011, 8 pages.
"Non-Final Office Action", U.S. Appl. No. 12/647,672, Aug. 14, 202, 10 pages.
"Non-Final Office Action", U.S. Appl. No. 13/367,341, Jul. 24, 2012, 20 pages.
"Non-Final Office Action", U.S. Appl. No. 13/555,897, Dec. 17, 2013, 11 pages.
"Non-Final Office Action", U.S. Appl. No. 14/573,625, May 5, 2016, 38 pages.
"Non-Final Office Action", U.S. Appl. No. 15/052,172, Jul. 19, 2016, 13 pages.
"Notice of Allowance", U.S. Appl. No. 11/428,536, Feb. 8, 2011, 6 pages.
"Notice of Allowance", U.S. Appl. No. 11/428,536, Jul. 23, 2010, 9 pages.
"Notice of Allowance", U.S. Appl. No. 12/271,850, Oct. 6, 2011, 8 pages.
"Notice of Allowance", U.S. Appl. No. 12/468,047, May 31, 2012, 9 pages.
"Notice of Allowance", U.S. Appl. No. 12/647,672, Nov. 1, 2012, 12 pages.
"Notice of Allowance", U.S. Appl. No. 13/367,341, Aug. 5, 2013, 9 pages.
"Notice of Allowance", U.S. Appl. No. 13/555,897, Jun. 8, 2015, 5 pages.
"Notice of Allowance", U.S. Appl. No. 13/555,897, Dec. 17, 2015, 5 pages.
"Notice of Allowance", U.S. Appl. No. 13/619,681, Mar. 3, 2015, 8 pages.
"Notice of Allowance", U.S. Appl. No. 13/620,171, Feb. 18, 2014, 7 pages.
"Notice of Allowance", U.S. Appl. No. 14/100,357, Sep. 15, 2014, 10 pages.
"Notice of Allowance", U.S. Appl. No. 14/754,115, May 4, 2016, 8 pages.
"Notice of Allowance", U.S. Appl. No. 14/754,115, Dec. 24, 2015, 8 pages.
"Response to the Department of Homeland Security and Border Protection Conveyance Security Device Requirements, Version 1.2", TeraHop Networks, Inc, Dec. 10, 2007, 62 pages.
"Restriction Requirement", U.S. Appl. No. 12/468,047, Oct. 5, 2011, 5 pages.
"TeraHop Networks—Tradeshow Handouts", MERIT-2030-2040 Gateway Controllers; MERIT-300 Incedent Node; MERIT-TL TeraLink System Software, 2006, 6 pages.
"TeraHop Networks Atlanta Airport Fire-Recuse Project Description of Project Components", TeraHop Networks, Feb. 7, 2008, 11 pages.
"TeraHop Networks—Documents A Through I, Including Brief Description", 121 pages.
"Website Page Detailing Features of Texas Instruments' Chipcon Products", Accessed on Dec. 19, 2008, 1 page.
"Written Opinion", Application No. PCT/US06/00868, Apr. 2, 2007, 3 pages.
"Written Opinion", Application No. PCT/US2006/026158, Nov. 21, 2006, 7 pages.
Easley,"Global Container Security System", U.S. Appl. No. 60/499,338—filed Sep. 3, 2003, 27 pages.
Garcia-Luna-Aceves,"Source-Tree Routing in Wireless Networks", Proceedings of Seventh International Conference on Network Protocols, Oct. 1999, 10 pages.
Gu,"C-ICAMA, A Centralized Intelligent Channel Assigned Multiple Access for Multi-Layer Ad-Hoc Wireless Networks with UAVs", Conference: Wireless Communications and Networking Conference, 2000, Feb. 2000, pp. 879-884.
Gu,"Hierarchical Routing for Multi-Layer Ad-Hoc Wireless Networks with UAVs", 21st Century Military Communications Conference Proceedings, Oct. 2000, 5 pages.
Haartsen,"Bluetooth—The Universal Radio Interface for Ad Hoc, Wireless Connectivity", Ericsson Review No. 3, Jan. 1998, 8 pages.
Haartsen,"Bluetooth: Vision, Goals, and Architecture", Mobile Computing & Communications Review, vol. 1, No. 2, Oct. 1998, 8 pages.
Hubaux,"Toward Self-Organized Mobile Ad Hoc Networks: The Terminodes Project", IEEE Communications Magazine (vol. 39, Issue: 1, Jan. 2001 ), Jan. 2001, 7 pages.
Iwata,"Scalable Routing Strategies for Ad hoc Wireless Networks", IEEE Journal on Selected Areas in Communications, Aug. 1999, 26 pages.
Keshavarzian,"Energy-Efficient Link Assessment in Wireless Sensor Networks", Conference on the IEEE computer and Communications Societies, vol. 3, Nov. 2004, 14 pages.
Lee,"On-Demand Multicast Routing Protocol (ODMRP) for Ad Hoc Networks", Retrieved at: https://tools.ietf.org/html/draft-ietf-manet-odmrp-02, Jan. 2000, 29 pages.
Melodia,"On the Interdependence of Distributed Topology Control and Geographical Routing in Ad Hoc and Sensor Networks", IEEE Journal on Selected Areas in Communications, vol. 23, No. 3, Mar. 2008, pp. 520-532.
Mingliang,"Cluster Based Routing Protocol (CBRP)", Internet-Draft, National University of Singapore, Aug. 1999, 27 pages.
Morgan,"Miniature Tags Provide Visibility & Cohesion for an LIA Battalion Level 'Proof of Principle'", Pacific NW National Laboratory, Apr. 2001, 11 pages.
Nageli,"Portable Detachable Self-Contained Tracking Unit for Two-Way Satellite Communication with a Central Server", U.S. Appl. No. 60/444,029, filed Jan. 31, 2003, 38 pages.
Pei,"A Wireless Hierarchical Routing Protocol with Group Mobility", Wireless Communications and Networking Conference, Jan. 21, 1999, 18 pages.
Pei,"Mobility Management in Hierarchical Multi-Hop Mobile Wireless Networks", Eight International Conference on Computer Communications and Networks Proceedings., Oct. 1999, 6 pages.
Perkins,"Ad Hoc Networks", Table of Contents, Chapters 1, 4, and 11, Jan. 2001, 112 pages.
Perkins,"Mobile Ad Hoc Networking Terminology", draft-ietf-manet-term-01.txt—Internet Draft, Nov. 17, 1998, 10 pages.

(56) References Cited

OTHER PUBLICATIONS

Ramanathan, "Hierarchically-Organized, Multihop Mobile Wireless Networks for Quality-of-Service Support", Mobile Networks and Applications, Jun. 1998, 36 pages.
Sharp, "Physical Reality: A Second Look, Supply Chain Systems", http://www.idsystems.com/reader/1999_03/phys0399_pt2/index.htm, Mar. 1999, 5 pages.
Sommer, "Group 4, Passive RF Tags", 4 pages.
Stojmenovic, "Design Guidelines for Routing Protocols in Ad Hoc and Sensor Networks with a Realistic Physical Layer", IEEE Communications Magazine ( vol. 43, Issue: 3, Mar. 2005 ), Mar. 2005, 6 pages.
Valdevit, "Cascading in Fibre Channel: how to build a multi-switch fabric", Brocade Communications Systems, available at http://www.brocade.com/SAN/white_papers/pdf/Cascading.pdf, 1999, 13 pages.
"Final Office Action", U.S. Appl. No. 15/052,172, filed Feb. 9, 2017, 13 pages.
"Notice of Allowance", U.S. Appl. No. 14/573,625, filed Mar. 28, 2017, 7 pages.

REDUCING A NUMBER OF WAKE-UP FRAMES IN A SEQUENCE OF WAKE-UP FRAMES

CROSS-REFERENCE TO RELATED APPLICATION

This application is a continuation of U.S. patent application Ser. No. 14/754,115, filed Jun. 29, 2015, now allowed, which is a continuation of U.S. patent application Ser. No. 13/620,171, filed Sep. 14, 2012, now U.S. Pat. No. 9,072,049, which is a continuation of U.S. patent application Ser. No. 12/647,672, filed Dec. 28, 2009, now U.S. Pat. No. 8,391,435, which is incorporated by reference herein, and which claims the benefit of U.S. Provisional Patent Application No. 61/140,884, filed Dec. 25, 2008, which is hereby incorporated herein by reference.

INCORPORATION BY REFERENCE

Additionally, the present application hereby incorporates herein by reference each of the following identified U.S. patent applications—as well as any publications thereof and any patents issuing therefrom; the following identified U.S. patent application publications; and the following identified U.S. patents: U.S. patent application Ser. Nos. 12/607,040; 12/609,009; 12/609,008; 12/608,837; 12/468,047; 12/367,544 (U.S. Patent Application Publication No. 2009/0135000 A1); U.S. patent application Ser. No. 12/367,543 (U.S. Patent Application Publication No. 2009/0161642 A1); U.S. patent application Ser. No. 12/367,542 (U.S. Patent Application Publication No. 2009/0181623 A1); U.S. patent application Ser. No. 12/353,197 (U.S. Patent Application Publication No. 2009/0129306 A1); U.S. patent application Ser. No. 12/352,992 (U.S. Patent Application Publication No. 2009/0122737 A1); U.S. patent application Ser. No. 12/343,865 (U.S. Patent Application Publication No. 2009/0104902 A1); U.S. patent application Ser. No. 12/343,822 (U.S. Patent Application Publication No. 2009/0103462 A1); U.S. patent application Ser. No. 12/271,850 (U.S. Patent Application Publication No. 2009/0092082 A1); U.S. patent application Ser. No. 12/140,253 (U.S. Patent Application Publication No. 2008/0303897 A1); U.S. patent application Ser. No. 11/930,797 (U.S. Patent Application Publication No. 2008/0151850 A1); U.S. patent application Ser. No. 11/930,793 (U.S. Patent Application Publication No. 2008/0112378 A1); U.S. patent application Ser. No. 11/930,788 (U.S. Patent Application Publication No. 2008/0165749 A1); U.S. patent application Ser. No. 11/930,785 (U.S. Patent Application Publication No. 2008/0143484 A1); U.S. patent application Ser. No. 11/930,782 (U.S. Patent Application Publication No. 2008/0212544 A1); U.S. patent application Ser. No. 11/930,779 (U.S. Patent Application Publication No. 2008/0129458 A1); U.S. patent application Ser. No. 11/930,777 (U.S. Patent Application Publication No. 2008/O111692 A1); U.S. patent application Ser. No. 11/930,770 (U.S. Patent Application Publication No. 2008/0144554 A1); U.S. patent application Ser. No. 11/930,761 (U.S. Patent Application Publication No. 2008/0112377 A1); U.S. patent application Ser. No. 11/930,753 (U.S. Patent Application Publication No. 2008/0142592 A1) now U.S. Pat. No. 7,535,339; U.S. patent application Ser. No. 11/930,749 (U.S. Patent Application Publication No. 2008/0130536 A1) now U.S. Pat. No. 7,538,658; U.S. patent application Ser. No. 11/930,740 (U.S. Patent Application Publication No. 2008/0150723 A1) now U.S. Pat. No. 7,538,657; U.S. patent application Ser. No. 11/930,736 (U.S. Patent Application Publication No. 2008/0143483 A1) now U.S. Pat. No. 7,538,656; U.S. patent application Ser. No. 11/847,309 (U.S. Patent Application Publication No. 2007/0291724 A1); U.S. patent application Ser. No. 11/847,295 (U.S. Patent Application Publication No. 2007/0291690 A1); U.S. patent application Ser. No. 11/832,998 (U.S. Patent Application Publication No. 2007/0273503 A1) now U.S. Pat. No. 7,378,959; U.S. patent application Ser. No. 11/832,991 (U.S. Patent Application Publication No. 2007/0268134 A1) now U.S. Pat. No. 7,378,958; U.S. patent application Ser. No. 11/832,979 (U.S. Patent Application Publication No. 2007/0268126 A1) now U.S. Pat. No. 7,378,957; U.S. patent application Ser. No. 11/610,427 (U.S. Patent Application Publication No. 2007/0159999 A1); U.S. patent application Ser. No. 11/618,931 (U.S. Patent Application Publication No. 2007/0155327 A1); U.S. patent application Ser. No. 11/555,173 (U.S. Patent Application Publication No. 2007/0099629 A1); U.S. patent application Ser. No. 11/555,164 (U.S. Patent Application Publication No. 2007/0099628 A1); U.S. patent application Ser. No. 11/465,466 (U.S. Patent Application Publication No. 2007/0043807 A1); U.S. patent application Ser. No. 11/465,796 (U.S. Patent Application Publication No. 2007/0041333 A1); U.S. patent application Ser. No. 11/460,976 (U.S. Patent Application Publication No. 2008/0315596 A1); U.S. patent application Ser. No. 11/428,536 (U.S. Patent Application Publication No. 2007/0002793 A1); U.S. patent application Ser. No. 11/428,535 (U.S. Patent Application Publication No. 2007/0002792 A1); U.S. patent application Ser. No. 11/425,047 (U.S. Patent Application Publication No. 2007/0069885 A1) now U.S. Pat. No. 7,554,442; U.S. patent application Ser. No. 11/425,040 (U.S. Patent Application Publication No. 2006/0287008 A1) now U.S. Pat. No. 7,539,520; U.S. patent application Ser. No. 11/424,850 (U.S. Patent Application Publication No. 2007/0004331 A1); U.S. patent application Ser. No. 11/424,849 (U.S. Patent Application Publication No. 2007/0004330 A1) now U.S. Pat. No. 7,574,168; U.S. patent application Ser. No. 11/424,847 (U.S. Patent Application Publication No. 2007/0001898 A1) now U.S. Pat. No. 7,583,769; U.S. patent application Ser. No. 11/424,845 (U.S. Patent Application Publication No. 2006/0287822 A1) now U.S. Pat. No. 7,574,300; U.S. patent application Ser. No. 11/423,127 (U.S. Patent Application Publication No. 2006/0289204 A1) now U.S. Pat. No. 7,563,991; U.S. patent application Ser. No. 11/422,306 (U.S. Patent Application Publication No. 2006/0282217 A1) now U.S. Pat. No. 7,542,849; U.S. patent application Ser. No. 11/422,304 (U.S. Patent Application Publication No. 2006/0276963 A1) now U.S. Pat. No. 7,526,381; U.S. patent application Ser. No. 11/422,321 (U.S. Patent Application Publication No. 2006/0276161 A1); U.S. patent application Ser. No. 11/422,329 (U.S. Patent Application Publication No. 2006/0274698 A1) now U.S. Pat. No. 7,529,547; U.S. patent application Ser. No. 11/306,765 (U.S. Patent Application Publication No. 2008/0136624A1) now U.S. Pat. No. 7,394,361; U.S. application Ser. No. 11/306,764 (U.S. Patent Application Publication No. 2006/0237490 A1) now U.S. Pat. No. 7,391,321; U.S. patent application Ser. No. 11/193,300 (U.S. Patent Application Publication No. 2007/0024066 A1) now U.S. Pat. No. 7,438,334; U.S. patent application Ser. No. 11/161,550 (U.S. Patent Application Publication No. 2007/0002808 A1) now U.S. Pat. No. 7,430,437; U.S. patent application Ser. No. 11/161,545 (U.S. Patent Application Publication No. 2006/0018274 A1) now U.S. Pat. No. 7,221,668; U.S. patent application Ser. No. 11/161,542 (U.S. Patent Application Publication No. 2006/0023679 A1) now U.S. Pat. No. 7,522,568; U.S. patent application Ser. No. 11/161,540 (U.S. Patent Application Publication No. 2007/0004431 A1) now U.S. Pat. No. 7,200,132; U.S. patent application Ser. No. 11/161,539 (U.S. Patent Application Publication No. 2006/0023678 A1) now U.S. Pat. No. 7,209,468; U.S. patent application Ser. No. 10/987,964 (U.S. Patent Application Publication No. 2005/0093703 A1) now U.S. Pat. No. 7,155,264; U.S. patent application Ser. No. 10/987,884 (U.S. Patent Application Publication No. 2005/0093702 A1) now U.S. Pat. No. 7,133,704; U.S. patent application Ser. No. 10/604,032 (U.S. Patent Application Publication No. 2004/0082296 A1) now U.S. Pat. No. 6,934,540; U.S. patent application Ser. No. 10/514,336 (U.S. Patent Application Publication No. 2005/0215280A1) now U.S. Pat. No. 7,209,771; and U.S. patent application Ser. No. 00/681,282 (U.S. Patent Application Publication No. 2002/0119770 A1) now U.S. Pat. No. 6,745,027.

Each of the foregoing patent application publications and patents is hereby incorporated herein by reference for purposes of disclosure of class-based network (CBN) technology, wake-up (WU) technology, and class-based networks that utilize such technologies (such as those of TeraHop Networks, Inc. of Alpharetta, Ga.), and systems employing such technologies including, inter alia: (1) implementations in the first responder context; (2) implementations in container tracking and monitoring context; and (3) implementations in equipment tracking and monitoring, especially rental construction equipment. It is intended that the CBN and WU technologies, and related features, improvements, and enhancements, as disclosed in these incorporated references may be utilized in combination with various embodiments and implementations of the present invention.

Further still, "Ad Hoc Wireless Networks", by C. Siva Ram Murthy and B. S. Manoj, published by Prentice Hall PTR, Upper Saddle River, N.J. (ISBN 013147023X), is hereby incorporated herein by reference.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official government records but, otherwise, all copyright rights whatsoever are reserved.

BACKGROUND OF THE INVENTION

The present invention generally relates to systems and methods for reducing power consumption and congestion in wireless networks. At least some methods and systems described herein could be considered a refinement of "Receiver with constant battery saving duty cycle" (U.S. Pat. No. 5,355,518) to reduce power consumption and bandwidth usage. Other US patents that describe similar techniques include: U.S. Pat. No. 4,964,121 for a "Battery saver for a TDM system"; U.S. Pat. No. 5,355,518 for a "Receiver with constant battery saving duty cycle"; and U.S. Pat. No. 4,802,240 for a "Synchronous receiving method for selective calling signal".

A need exists for improvement in power consumption and congestion associated with wireless networks. This, and other needs, are addressed by one or more aspects of the present invention.

SUMMARY OF THE INVENTION

The present invention includes many aspects and features. Moreover, while many aspects and features relate to, and are described in, the context of systems and methods for reducing power consumption and congestion in wireless networks, the present invention is not limited to use only in such systems and methods, as will become apparent from the following summaries and detail descriptions of aspects, features, and one or more embodiments of the present invention.

Accordingly, one aspect of the present invention relates to a method for receiver state estimation. The method includes communication, from a first communications device to a second communications device, a first plurality of wake-up frames; receiving at the first communications device from the second communications device, an indication of a received wake-up frame of the communicated first plurality of wake-up frames; determining, by the first communications device, a time at which the second communications device in a ready state based on the received indication; subsequently communicating, from the first communications device to the second communications device, a second plurality of wake-up frames. The first plurality is greater than the second plurality, the reduction in number from the first plurality to the second plurality being based on the determined time at which the second communications device is in a ready state.

In a feature of this aspect of the invention, the first communications device and the second communications device each comprise a remote sensor node (RSN).

Another aspect of the present invention relates to a method for receiver state estimation. The method includes communicating, from a first communications device to a second communications device, a first plurality of wake-up frames; receiving, at the first communications device from the second communications device, an indication of a received wake-up frame of the communicated first plurality of wake-up frames; determining, by the first communications device, an offset time relative to a clock of the first communications device based on the received indication; subsequently communicating, from the first communications device to the second communications device, a second plurality of wake-up frames. The first plurality is greater than the second plurality, the reduction in number from the first plurality to the second plurality being based on the determined offset time.

In one or more embodiments, aspects and features described herein are utilized in combination with aspects and features described in one or more of the patents, publications, or applications incorporated herein by reference.

In addition to the aforementioned aspects and features of the present invention, it should be noted that the present invention further encompasses the various possible combinations and subcombinations of such aspects and features.

BRIEF DESCRIPTION OF THE DRAWINGS

One or more preferred embodiments of the present invention now will be described in detail with reference to the accompanying drawings, wherein the same elements are referred to with the same reference numerals, and wherein.

DETAILED DESCRIPTION

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although the steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. §112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used here, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basked having cheese and crackers" describes "a picnic basked having cheese, wherein the picnic basket further has crackers," as well as describes "a picnic basket having crackers, wherein the picnic basket further has cheese."

Referring now to the drawings, one or more preferred embodiments of the present invention are next described. The following description of one or more preferred embodiments is merely exemplary in nature and is in no way intended to limit the invention, its implementations, or uses.

Figure 1:
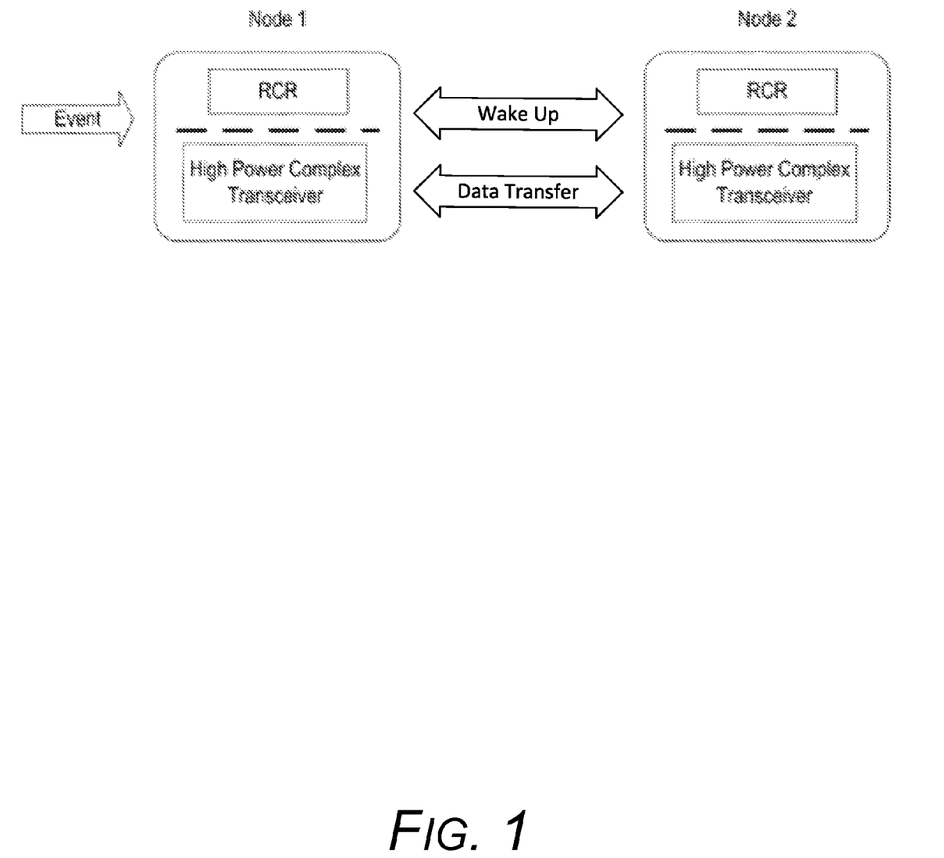
FIG. 1 illustrates a high level overview of wireless nodes including both a reduced complexity radio, and a high power complex transceiver.
Figure 2:
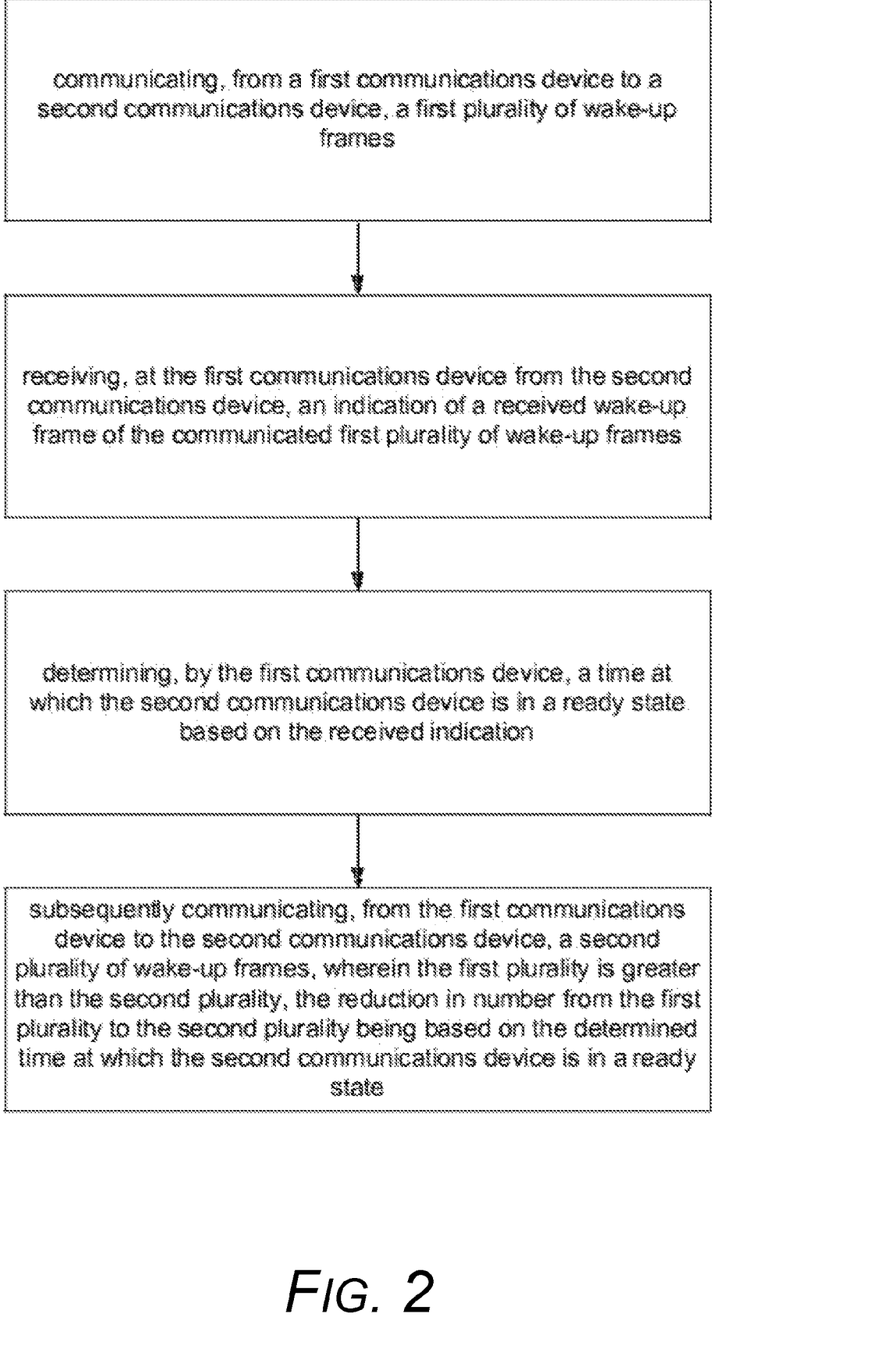
FIG. 2 illustrates a flowchart in accordance with a method for receiver state estimation.
Figure 3:
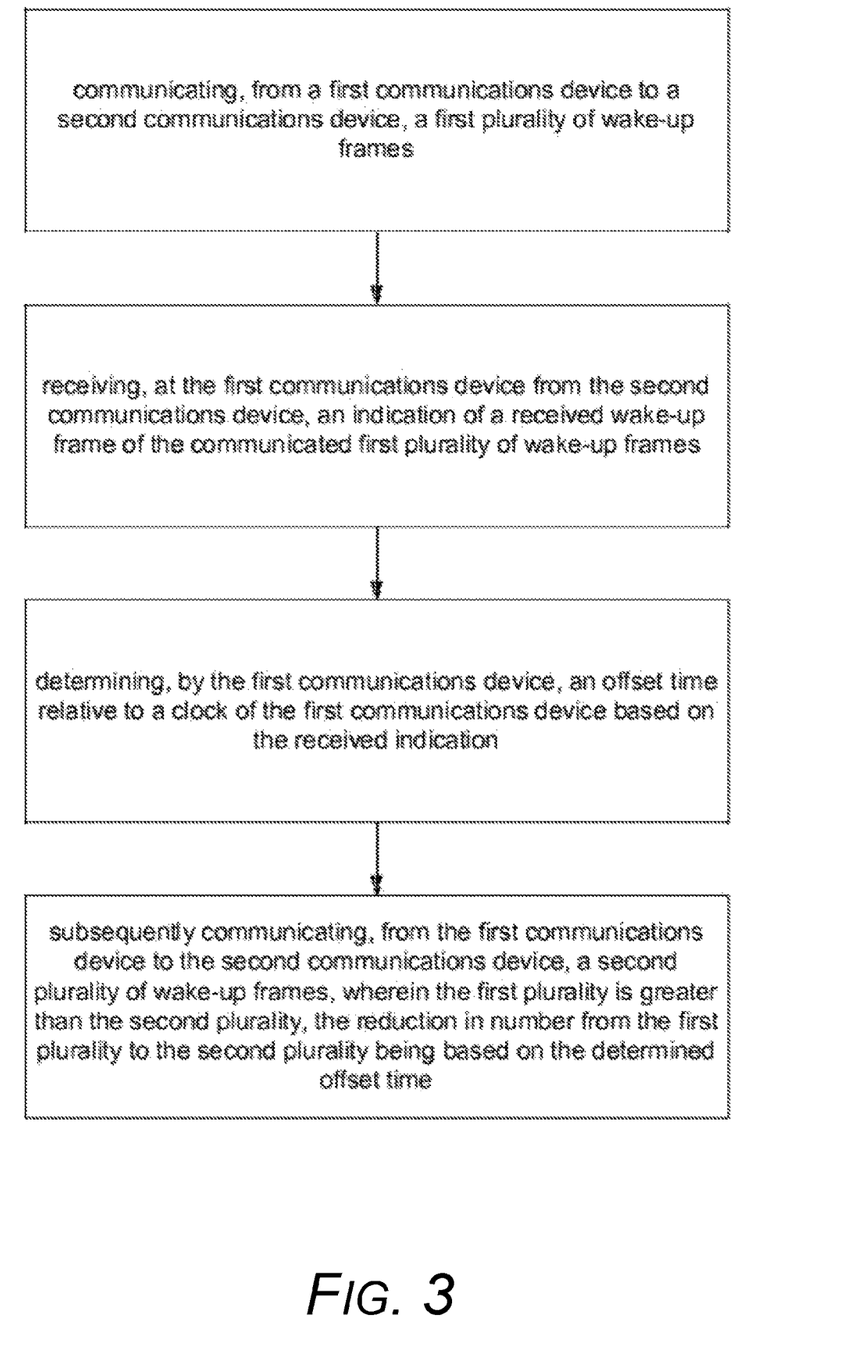
FIG. 3 illustrates a flowchart in accordance with a method for receiver state estimation.

FIG. 1 illustrates a high level overview of wireless nodes including both a reduced complexity ratio (RCR), and a high power complexity transceiver. Preferably, each node is configured to receive a wake-up message via the RCE, that can then power up the high power complex transceiver for data transfer.

In preferred implementations, a duty-cycled received comprises a receiver which may be in either an idle or ready state, and will alternate periods of idleness and activity. To send a message to the receiver without any knowledge of when the receiver will be ready, other than the period, a sender must prefix multiple copies of a wake-up message for a duration equal to or greater than the period of the receiver's duty cycle. Preferably, these wake-up messages are numbered in descending order, such that when the number of wake-up message reaches zero, the data intended for the receiver will be transmitted.

Upon reception of a message, the receiver immediately replies to acknowledge reception of the data. In a preferred implementation utilizing receiver state estimation, the receiver also indicates the number of the first wake-up message received. The transmitter then calculates, to some accuracy, the time at which the receiver is in a ready state. Given that the ready state of the receiver occurs on a known periodic basis, any future time at which the receiver will be ready can be calculated, within the limits of the available time-base.

If the time at which the receiver becomes ready can be estimated to within a time less than the period of the receiver duty-cycle, fewer wake-up transmission must be prefixed to future data transmissions. This can save power by using fewer transmissions, and can additionally reduce congestion.

Such preferred methodologies reduce the power cost to the sender and bandwidth cost to the system when compared to a straightforward wake-up radio system. This method can be utilized separate from, or in combination with, aspects and features of wake-up transceiver (WU) technology patented by TeraHop Networks, Inc. (see U.S. Pat. No. 7,209,771, incorporated above by reference, and the patents related thereto), or other known wake-up technology and methodologies. This method also overcomes the need for maintenance in a strictly synchronized network.

Turning to another example, consider an implementation involving remove sensor nodes (RSNs). Each RSN includes a wake-up receiver, and transmissions to RSNs are preambled with wake-up attention (WU_ATTN) frames. In a preferred implementation, a receiving RSN indicates to a transmitting RSN a received WU_ATTN frame, thus allowing a relative time offset of the receiving RSN's receiving window to be known. Subsequent transmissions to the receiving RSN can utilize fewer WU_ATTN frames, within the limits of the RSN's timebase tolerances.

For example, WU_ATTN packets might be spaced 274.7 µs apart, and might be transmitted for 105 ms. Thus, the number of WU_ATTN packets sent would be 105 ms/274.7 µs, or 382. If, however, the receiving RSN indicates that it received US_ATTN packet number 75, then the transmitting RSN can utilize this knowledge to calculate when the receiving RSN received the packet relative to the transmitting RSN's clock. This offset time can be stored and subsequently used to reduce the number of WU_ATTN packets utilized to wake up that RSN. In subsequent transactions, ⅕ or less, WU_ATTN frames can be utilized. Notably, a frame number of a received WU_ATTN frame is preferably still sent back by the receiving RSN, thus allowing for further refinement of a time offset.

Appendix C, which is hereby incorporated herein by reference and represents a copy of Exhibit C of U.S. Provisional Patent Application No. 61/140,884, which is incorporated herein by reference, comprises additional disclosure of one or more implementations utilizing RSNs.

Alternatively, or additionally, an embodiment in accordance with the present invention could be implemented utilizing a Chipcon CC2500 Transceiver, sold by Texas Instruments (see Appendix A, which is hereby incorporated herein by reference and represents a copy of Exhibit A of U.S. Provisional Patent Application No. 61/140,884, which is incorporated herein by reference), by utilizing a timer feature of the CC2500. Further detail can be found in Note AN047 of Appendix B, which is hereby incorporated herein by reference and represents a copy of Exhibit B of U.S. Provisional Patent Application No. 61/140,884, which is incorporated herein by reference.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

The invention claimed is:

1. A method for reducing a number of wake-up frames in a sequence of wake-up frames, comprising:
   receiving, from a communications device, an identification of a wake-up frame of a first sequence of wake-up frames transmitted to the communications device; and
   determining, based on the identification, a number of wake-up frames in a second sequence of wake-up frames, the number of wake-up frames in the second sequence being less than a number of wake-up frames in the first sequence.

2. The method of claim 1, further comprising transmitting, to the communications device, the first sequence of wake-up frames.

3. The method of claim 1, wherein the identification of the wake-up frame in the first sequence comprises an index of the wake-up frame in the first sequence.

4. The method of claim 3, wherein the determining the number of wake-up frames in the second sequence comprises dividing the number of wake-up frames in the first sequence by the index.

5. The method of claim 1, wherein a duration of time of the first sequence of wake-up frames is greater than or equal to a period of a duty cycle of the communications device.

6. The method of claim 5, wherein a duration of time of the second sequence of wake-up frames is less than the period of the duty cycle of the communications device.

7. The method of claim 1, wherein the method is performed in iterations such that the second sequence of wake-up frames for an earlier iteration is the first sequence of wake-up frames for a later iteration.

8. The method of claim 1, wherein an amount of power consumed to produce the second sequence of wake-up frames is less than an amount of power consumed to produce the first sequence of wake-up frames.

9. The method of claim 1, wherein, for a given network bandwidth, an amount of second information communicated in conjunction with the second sequence of wake-up frames is greater than an amount of first information communicated in conjunction with the first sequence of wake-up frames.

10. A communications device, comprising:
    a receiver configured to receive, from an additional communications device, an identification of a wake-up frame of a first sequence of wake-up frames transmitted to the additional communications device; and
    a processor configured to determine, based on the identification, a number of wake-up frames in a second sequence of wake-up frames, the number of wake-up frames in the second sequence being less than a number of wake-up frames in the first sequence.

11. The communications device of claim 10, further comprising a transmitter configured to transmit, to the additional communications device, the first sequence of wake-up frames.

12. The communications device of claim 10, wherein the identification of the wake-up frame in the first sequence comprises an index of the wake-up frame in the first sequence.

13. The communications device of claim 12, wherein the processor is configured to determine the number of wake-up frames in the second sequence by dividing the number of wake-up frames in the first sequence by the index.

14. The communications device of claim 10, wherein a duration of time of the first sequence of wake-up frames is greater than or equal to a period of a duty cycle of the additional communications device.

15. The communications device of claim 14, wherein a duration of time of the second sequence of wake-up frames is less than the period of the duty cycle of the additional communications device.

16. The communications device of claim 10, wherein the communications device is configured to receive the identification and determine the number of wake-up frames in iterations such that the second sequence of wake-up frames for an earlier iteration is the first sequence of wake-up frames for a later iteration.

17. The communications device of claim 10, wherein an amount of power consumed to produce the second sequence of wake-up frames is less than an amount of power consumed to produce the first sequence of wake-up frames.

18. The communications device of claim 10, wherein, for a given network bandwidth, an amount of second information communicated in conjunction with the second sequence of wake-up frames is greater than an amount of first information communicated in conjunction with the first sequence of wake-up frames.

19. A communications device, comprising:
a transmitter configured to communicate a first plurality of wake-up frames to an additional communications device;
a receiver configured to receive, from the additional communications device in response to the first plurality of wake-up frames, an indication of a received wake-up frame of the first plurality of wake-up frames;
a processor configured to determine a time at which the additional communications device is in a ready state based on the indication; and
the transmitter configured to subsequently communicate, to the additional communications device, a second plurality of wake-up frames, the first plurality of wake-up frames being greater than the second plurality of wake-up frames, a reduction in a number of the first plurality of wake-up frames to the second plurality of wake-up frames being based on a time at which the additional communications device is in the ready state.

20. The communications device of claim 19, further comprising a sensor.

21. The communications device of claim 19, wherein the communications device comprises a remote sensor node.

22. The communications device of claim 19, wherein the wake-up frames comprise wake-up messages.

23. The communications device of claim 19, wherein the wake-up frames of the second plurality of wake-up frames are numbered in descending order.

24. The communications device of claim 23, wherein the communications device is further configured to transmit a message after a last wake-up frame, of at least one of the first plurality of wake-up frames or the second plurality of wake-up frames, has been communicated.

25. A communications device, comprising:
a transmitter configured to communicate a first plurality of wake-up frames, to an additional communications device;
a receiver configured to receive, from the additional communications device in response to the first plurality of wake-up frames, an indication of a received wake-up frame of the first plurality of wake-up frames,
a processor configured to determine an offset time relative to a clock of the communications device based on the indication; and
the transmitter configured to subsequently communicate, to the additional communications device, a second plurality of wake-up frames, the first plurality of wake-up frames being greater than the second plurality of wake-up frames, a reduction in a number of the first plurality of wake-up frames to the second plurality of wake-up frames being based on the determined offset time.

26. The communications device of claim 25, wherein the communications device is configured to store determined offset times.

27. The communications device of claim 25, further comprising a sensor.

28. The communications device of claim 25, wherein the communications device comprises a remote sensor node.

29. The communications device of claim 25, wherein the wake-up frames comprise wake-up messages.

30. The communications device of claim 25, wherein the wake-up frames of the second plurality of wake-up frames are numbered in descending order.

31. The communications device of claim 30, wherein the transmitter is further configured to transmit a message after a last wake-up frame, of at least one of the first plurality of wake-up frames or the second plurality of wake-up frames, has been communicated.

32. A system, comprising:
a first communications device configured to transmit a first plurality of wake-up frames to a second communications device;
the second communications device configured to:
receive one or more wake-up frames of the first plurality of wake-up frames from the first communications device;
based upon the receipt of the one or more wake-up frames of the first plurality of wake-up frames, transmit an indication of a received wake-up frame to the first communications device;
the first communications device configured to:
receive the indication of the received wake-up frame from the second communications device;
based upon the receipt of the indication, determine an offset time relative to a clock of the first communications device, and
subsequently transmit a second plurality of wake-up frames to the second communications device, the first plurality of wake-up frames being greater than the second plurality of wake-up frames, a reduction in a number from the first plurality of wake-up frames to the second plurality of wake-up frames being based on the determined offset time.

33. The system of claim 32, wherein the first communications device and the second communications device each comprise a remote sensor node (RSN).

* * * * *